United States Patent
Zhu et al.

(10) Patent No.: US 10,830,575 B2
(45) Date of Patent: Nov. 10, 2020

(54) SYNCHRONIZATION METHOD FOR MULTI-STATION DATA OF DYNAMIC COORDINATE MEASUREMENT BY WORKSHOP MEASURING AND POSITIONING NETWORK

(71) Applicant: Tianjin University, Tianjin (CN)

(72) Inventors: Jigui Zhu, Tianjin (CN); Linghui Yang, Tianjin (CN); Yongjie Ren, Tianjin (CN); Jiarui Lin, Tianjin (CN); Ziyue Zhao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/759,225

(22) PCT Filed: May 26, 2016

(86) PCT No.: PCT/CN2016/083478
§ 371 (c)(1),
(2) Date: Mar. 11, 2018

(87) PCT Pub. No.: WO2017/049940
PCT Pub. Date: Mar. 30, 2017

(65) Prior Publication Data
US 2018/0306571 A1  Oct. 25, 2018

(30) Foreign Application Priority Data
Sep. 21, 2015 (CN) .......................... 2015 1 0611544

(51) Int. Cl.
*G01B 11/03* (2006.01)
*G01B 5/16* (2006.01)
*G01C 15/02* (2006.01)

(52) U.S. Cl.
CPC ................ *G01B 11/03* (2013.01); *G01B 5/16* (2013.01); *G01C 15/02* (2013.01)

(58) Field of Classification Search
CPC ........... G01B 11/03; G01B 5/16; G01C 15/02
(Continued)

(56) References Cited

U.S. PATENT DOCUMENTS 6,545,751 B2 * 4/2003 Beliveau .............. G01C 15/002
356/141.4
7,660,588 B2 * 2/2010 Sheynblat ............. G01S 5/0263
455/456.1
(Continued)

*Primary Examiner* — Roy M Punnoose
(74) *Attorney, Agent, or Firm* — George G. Wang; Bei & Ocean

(57) ABSTRACT

The present invention discloses a synchronization method for multi-station data of dynamic coordinate measurement by a workshop measuring and positioning network. The method comprises the following steps of: determining a measuring and positioning space according to the in-situ measurement dimension, selecting locations for placing several transmitters, calibrating external parameters of the transmitters by a reference ruler, and establishing a measurement field; in a communication data packet of a signal processor, attaching local clock information into the angle information of each transmitter; and setting fixed time nodes on a time axis, and synchronizing data of different transmitters to corresponding time nodes so as to realize data synchronization. The present invention improves the conventional static measurement function of the wMPS to a certain dynamic measurement function for expanding the application ranges of the wMPS, and provides a technical support for realization of real-time, high-accuracy and large-scale in-situ industrial coordinate measurement based on wMPS.

3 Claims, 4 Drawing Sheets

(58) Field of Classification Search
USPC .......................................................... 356/614
See application file for complete search history.

(56) References Cited

U.S. PATENT DOCUMENTS

| | | | |
|---|---|---|---|
| 7,679,727 B2* | 3/2010 | Benz .................... | G01C 15/002 |
| | | | 356/4.01 |
| 9,658,055 B2* | 5/2017 | Zhu ....................... | G01B 11/002 |
| 2002/0060788 A1* | 5/2002 | Ohtomo ............... | G01C 15/002 |
| | | | 356/139.1 |
| 2003/0174305 A1* | 9/2003 | Kasper ................. | G01C 15/002 |
| | | | 356/3.09 |
| 2016/0265903 A1* | 9/2016 | Zhu ....................... | G01B 11/002 |
| 2018/0216941 A1* | 8/2018 | Zhu ......................... | B25J 13/08 |

\* cited by examiner

Determining a measurement positioning space according to the in-situ measurement dimension, selecting locations for placing a plurality of transmitters, calibrating external parameters of the transmitters by a reference ruler, and establishing a measurement field.

In a communication data packet of a signal processor, attaching local clock information into the angle information of each transmitter.

Setting fixed time nodes on a time axis, and synchronizing data of different transmitting stations to corresponding time nodes so as to realize data synchronization.

FIG. 5

SYNCHRONIZATION METHOD FOR MULTI-STATION DATA OF DYNAMIC COORDINATE MEASUREMENT BY WORKSHOP MEASURING AND POSITIONING NETWORK

TECHNICAL FIELD

The present invention relates to the field of in-situ dynamic measurement of large-scale 3D coordinates and in particular to a data synchronization method in the real-time dynamic tracking measurement process of a large apparatus by using a workshop measuring and positioning system.

BACKGROUND OF THE PRESENT INVENTION

As a novel workshop measuring and positioning system using a multi-station network, the workshop Measuring and Positioning System (hereinafter referred to as wMPS) can realize high-accuracy automatic parallel multi-task measurement in a large-scale and spatial global coordinate system and has a broad demand in large-scale manufacturing fields such as spaceflight, aviation and shipbuilding. As shown in FIGS. 1 and 2, the wMPS (i.e., the measuring and positioning system described in Establishment of Measurement Network of Scanning Plane Laser Space Positioning System) mainly consists of transmitter, receivers, a signal processor and a computing workstation. Each of the transmitters emits two laser planes which rotate about an axis of rotation at a constant speed and are inclined to a certain extent. Meanwhile, once the transmitter rotates across a fixed position, the transmitter emits synchronous light pulse as a synchronization maker, to realize scanning within the measured space and thus provide positioning service signals to the receiver within the measured space. The receiver receives light signals from the transmitter, converts the light signals into electrical signals and transmits the electrical signals to the signal processor. The signal processor performs timing measurement on the light signals transmitted by the transmitters by using internal crystal oscillator as time standard for clock timing, and acquires angle information of each receiver in the coordinate system of each transmitter. The angle information is uploaded to the computing workstation, and three-dimensional coordinates of the receiver can be calculated according to an angle intersection relationship between multiple transmitters.

Under this working mode, since the transmitters unidirectionally emit scanning signals and the signal processor realizes timing angle measurement by using local crystal oscillator as timing basis, there is no closed loop in the broadcasting mode between transmission and reception, so that high-accuracy automatic three-dimensional coordinate measurement of multiple parallel points can be realized, and the purpose of extending range can be achieved by increasing the number of transmitters. At present, the wMPS system has been successfully applied in the machining and assembly process requiring multi-operation parallel processing and overall accuracy control in aerospace manufacturing sites.

Since the wMPS system includes multiple transmitters and the identification and recognition of different transmitters are based on different rotation speed parameters, the information received from different transmitters by the receiver is not synchronous. In the static or quasi-static applications of the wMPS, the data asynchronism between multiple transmitters will not influence the result of measurement and the accuracy. However, due to the movement of the receiver during dynamic measurement, the data asynchronism between multiple transmitters will result in different timing standards for angle measurement of different transmitters and thus result in measurement errors. FIG. 3 shows a schematic diagram of a measurement system consisting of two transmitters at the moment $t_{01}$, the receiver receives signals from the transmitter 1 so that angle information in the coordinate system of the transmitter 1 at the current moment is calculated; while at the moment toe, the receiver receives signals from the transmitter 2 so that angle information in the coordinate system of the transmitter 2 at the current moment is obtained. Due to the movement of the receiver, the location at a different moment is different according to the movement conditions, so that errors are inevitable in the existing calculation mode. In other words, during the movement of an object, light signals from multiple transmitters sequentially reach the surface of a single receiver at different locations, resulting in an intersection error.

SUMMARY OF THE PRESENT INVENTION

The present invention provides a synchronization method for multi-station data of dynamic coordinate measurement by a workshop measuring and positioning network. By fully utilizing the existing clock information inside the signal processor, the present invention synchronizes information from multiple transmitters in a same processor to a same moment, so that the accuracy of in-situ dynamic coordinate measurement is improved, as described in detail hereinafter.

A synchronization method for multi-station data of dynamic coordinate measurement by a workshop measuring and positioning network is provided, including the following steps of:

Determining a measurement positioning space according to the in-situ measurement dimension, selecting locations for placing a plurality of transmitters, calibrating external parameters of the transmitters by a reference ruler, and establishing a measurement field;

In a communication data packet of a signal processor, attaching local clock information into the angle information of each transmitter; and Setting fixed time nodes on a time axis, and synchronizing data of different transmitting stations to corresponding time nodes so as to realize data synchronization.

The step of "in a communication data packet of a signal processor, attaching local clock information into the angle information of each transmitting station;" specifically comprises following steps:

1) Receiving, by a receiver, synchronous light pulse signals and scanning light pulse signals emitted by the transmitters, converting the synchronous light pulse signals and scanning light pulse signals into electrical pulses, and transmitting the electrical pulses to the signal processor;

2) Matching, by the signal process and by using internal crystal oscillator as a timing standard, the timing on the electrical pulses of different transmitters according to the period of rotation of the transmitters; and 3) Packing, by the signal processor, the angle information of different transmitters and corresponding timestamps received by a same receiver to form data frames, and uploading the data frames to a computing workstation.

The step of "setting fixed time nodes on a time axis and synchronizing data of different transmitters to corresponding time nodes so as to realize data synchronization" specifically comprises following steps:

1) Selecting the timestamp $t_{0n}$ of the latest moment from the receiver, and extracting the timestamp $t_{0n-1}$ of the previous moment adjacent to the latest moment, where the time node corresponding to the timestamp of the latest moment is $t_{pn}$;

2) Synchronizing data of the transmitters at a moment having a timestamp $t_{0n}$ onto the time node $t_{pn}$; and 3) Synchronizing data of all the transmitters onto corresponding time nodes, and obtaining coordinate values at this moment by an angle intersection principle, so as to realize data synchronization of multiple transmitters.

The technical solutions of the present invention have the following beneficial effects. By using the clock of the signal processor in the existing wMPS as time scale and synchronizing data received from multiple transmitters by a same receiver onto a same moment, the present invention effectively reduces the measurement error of the same receiver resulted from data measurement moment asynchronism between the multiple transmitters. Moreover, the present invention improves the conventional static measurement function of the wMPS to a certain dynamic measurement function for expanding the application ranges of the wMPS, and provides a technical support for realization of real-time, high-accuracy and large-scale in-situ industrial coordinate measurement based on the wMPS.

BRIEF DESCRIPTION OF THE DRAWINGS

FIG. 5 is a flowchart of a synchronization method for multi-station data of dynamic coordinate measurement by a workshop measuring and positioning network.

DETAILED DESCRIPTION OF THE PRESENT INVENTION

Figure 1:
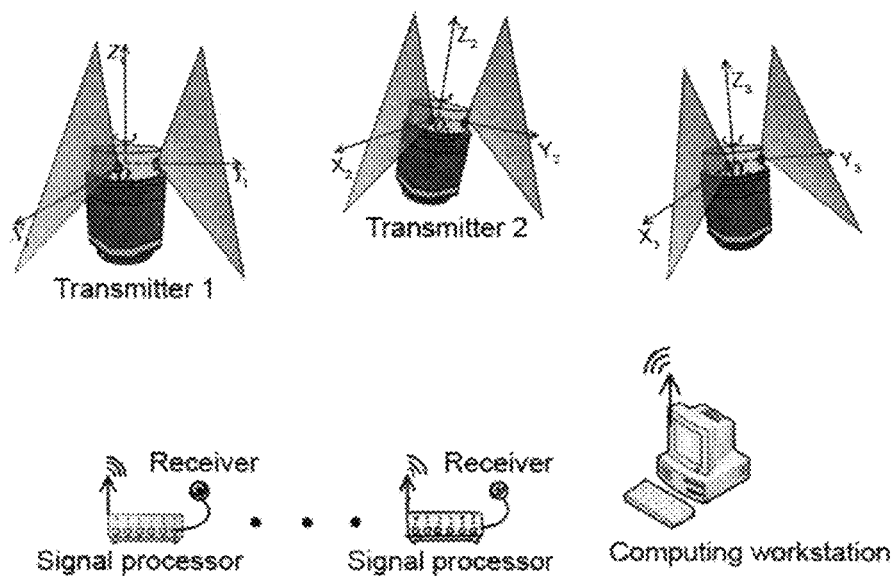
FIG. 1 is a schematic diagram of a wMPS.
Figure 2:
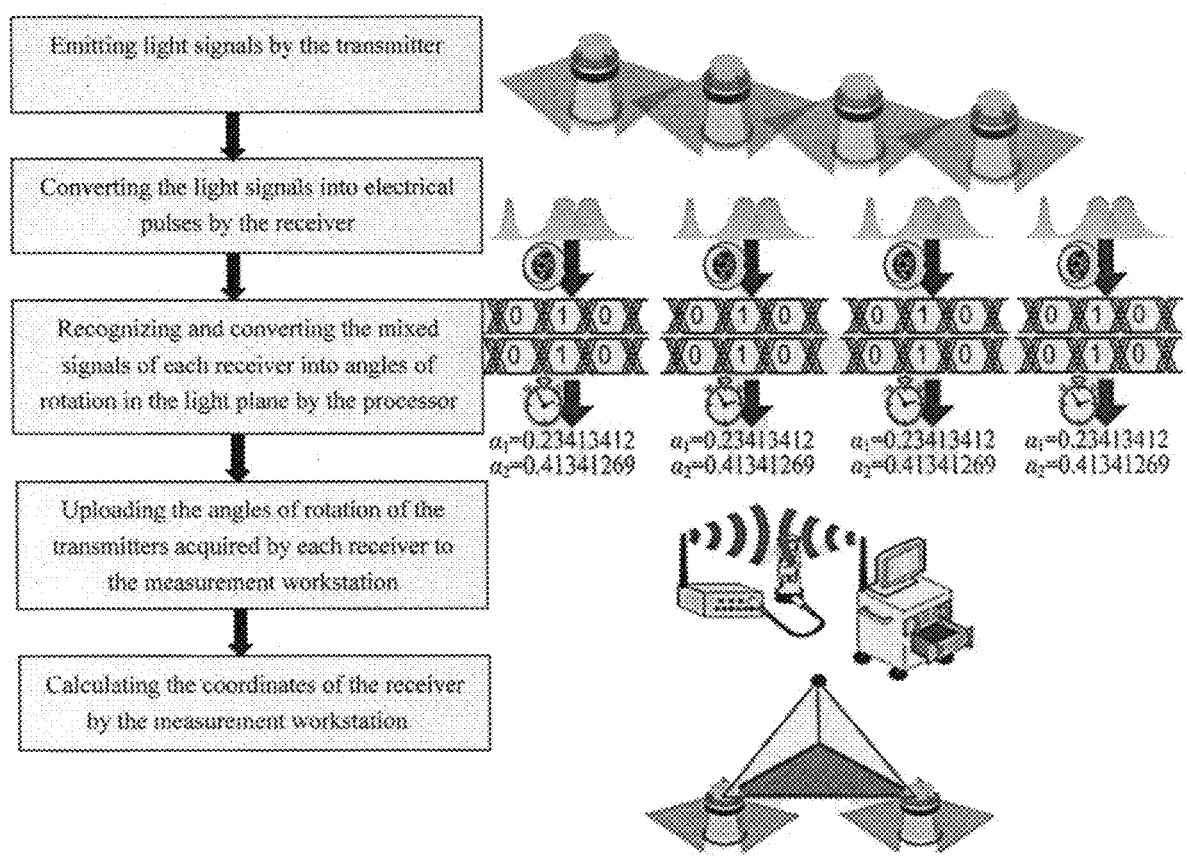
FIG. 2 is a schematic diagram of the operation principle of the wMPS.
Figure 3:
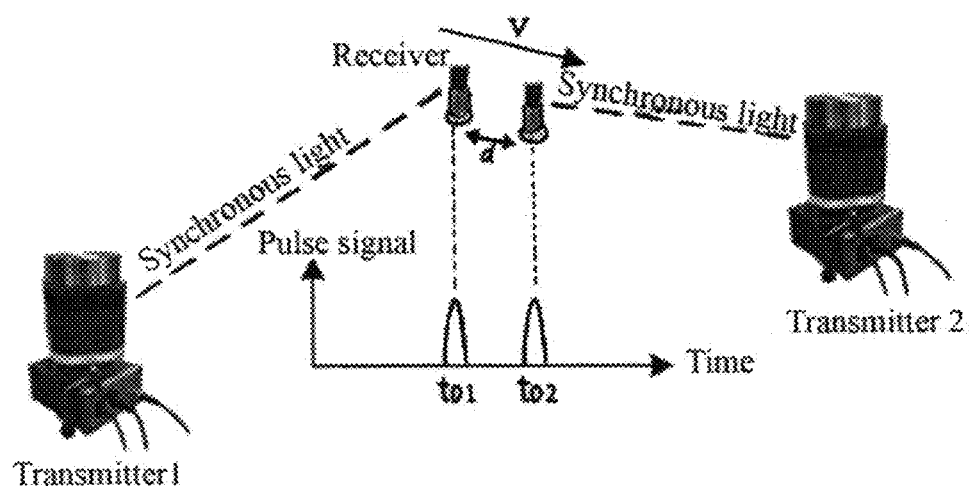
FIG. 3 is a schematic diagram of a coordinate measurement error resulted from data asynchronism of multiple transmitters.

To make the objectives, technical solutions and advantages of the present invention clearer, the embodiments of the present invention will be further described below in detail.

It can be known from the analysis of the background art that the error is determined by the system measurement principle, and ideally, it can be ensured that data synchronization of different transmitters can be compensated within the measured slowest period of rotation of the transmitters (for example, if the minimum rotation speed of multiple transmitting stations is 1800 rpm, the synchronization time error can be within 33.33 ms). Considering that the signal processor performs time stamping on light pulses received by a receiver by using single crystal oscillator, the present invention focuses on to the methods of synchronizing and compensating data from multiple transmitters by using the result of timing so as to improve the accuracy of dynamic coordinate measurement to the greatest extent.

For this purpose, referring to FIG. 5, the technical solutions of an embodiment of the present invention are as follows:

101: Determining a measuring and positioning space according to the in-situ measurement dimension, selecting proper locations (e.g. having stable foundation, and the space without sheltering) for placing a plurality of transmitters, calibrating external parameters of the transmitting stations by a reference ruler, and establishing a measurement field;

102: In a communication data packet of a signal processor, attaching local clock information into the angle information of each transmitter (that is, adding a timestamp for the measured data).

The step 102 specifically includes the following steps:

1) Receiving, by the receiver, synchronous light pulse signals and scanning light pulse signals emitted by the transmitters, converting the two signals into electrical pulses, and transmitting the electrical pulses to the signal processor;

2) Matching, by the signal processor and by using internal crystal oscillator as a timing standard, the timing on the electrical pulses of different transmitters according to the period of rotation of the transmitters;

For example, if the receiver receives synchronous light pulse signals from the transmitters at the moment $t_0$ and then continuously receives two scanning light pulse signals from the transmitters at the moment $t_1$ and moment $t_2$, the angles of rotation of the transmitters scanning the receiver within the period of rotation T are respectively:

$$\theta_1 = \frac{t_1 - t_0}{T}$$

$$\theta_2 = \frac{t_2 - t_0}{T}$$

Since the moment $t_0$ of the synchronous light pulse signals marks the starting time point of signal transmission of the transmitters within this period, the moment $t_0$ recorded by the signal processor is used as timestamps of the angles $\theta_1$ and $\theta_2$ of the transmitting stations;

3) Packing, by the signal processor, the angle information of different transmitters and corresponding timestamps received by a same receiver to form data frames, and uploading the data frames to a computing workstation;

103: Setting fixed time nodes on a time axis, and synchronizing data from different transmitters to corresponding time nodes so as to realize data synchronization;

In practical applications, due to the asynchronism of data from multiple transmitters received by a same receiver, a synchronization error will be caused if direct calculation is employed. The angle information of different transmitters have timestamps, which can be synchronized to a same time axis according to the timestamps. On this basis, the present invention sets fixed time nodes on the time axis, and synchronizes data from different transmitters to corresponding time nodes so as to realize data synchronization.

Figure 4:
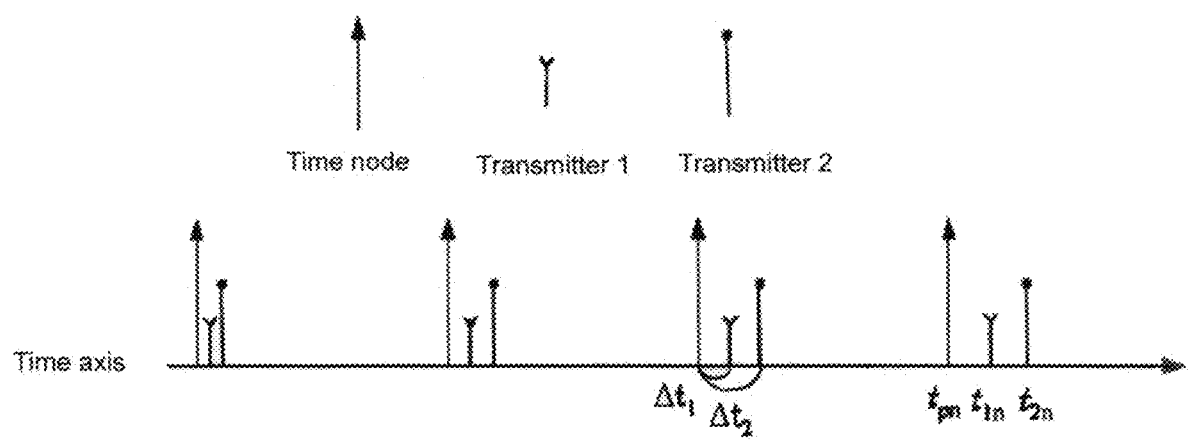
FIG. 4 is a schematic diagram of a time sequence of a system having two transmitters.

By taking a system having two transmitters as example, as shown in FIG. 4, $t_{p1}, t_{p2}, t_{p3} \ldots t_{pn}$ denote the time nodes, $t_{j1}, t_{j2}, t_{j3} \ldots t_{jn}$ denote the time when the signals from the corresponding transmitters are received, and j denotes the serial number of the transmitter. The synchronization of data from different transmitters requires the following conditions:

1) During the movement of the receiver, due to its limited movement conditions, the movement within a very short period of time (about dozens of milliseconds) can be approximately regarded as a forward movement in a certain direction at a constant speed of v.

2) In the measurement field, the data output of the signal processor is temporarily continuous, and the data of the transmitter at any moment within a short period of time can be inferred according to the data of the transmitters measured for two adjacent times.

After the time sequence is set, the data from each transmitter is synchronized to the corresponding node of the time sequence. By taking one transmitter as example, the specific process of the data synchronization method is as follows:

1) Selecting the timestamp $t_{On}$ of the latest moment from the receiver, and extracting the timestamp $t_{On-1}$ of the previous moment adjacent to the latest moment, where the time mode corresponding to the timestamp of the latest moment is $t_{pn}$.

2) Synchronizing data of the transmitter at a moment having a timestamp $t_{On}$ onto the time node $t_{pn}$ by the following formula:

$$t'_{in} = t_{in} + \frac{t_{pn} - t_{On}}{t_{On} - t_{On-1}} * (t_{in} - t_{in-1}), (i = 1, 2)$$

Where, i denotes the serial number of scanning light, $t_{in}'$ denotes the value of the scanning angle of the scanning light i at the time node $t_{pn}$, $t_{in}$ denotes the value of the scanning angle of the scanning light i at the timestamp $t_{On}$, and $t_{in-1}$ denotes the value of the scanning angle of the scanning light i at the timestamp $t_{in-1}$;

3) By the step 2), synchronizing all data of the transmitter to the corresponding time nodes.

Thus, by performing the above steps, the present invention obtains data of multiple transmitters at the corresponding time nodes, and further obtains the coordinate value at this moment by an angle intersection principle, so as to realize data synchronization of multiple transmitters.

In conclusion, the embodiment of the present invention fully utilizes the existing clock information inside a signal processor, to synchronize the information from multiple transmitters in a same processor to a same moment, so that the accuracy of in-situ dynamic coordinate measurement is improved. The embodiment of the present invention improves the conventional static measurement function of the wMPS to a certain dynamic measurement function, expands the application range of the wMPS, and provides a technical support for realization of real-time, high-accuracy and large-scale in-situ industrial coordinate measurement based on wMPS.

In this embodiment of the present invention, unless the model numbers of devices are specified, the model numbers of other devices are not limited as long as the above functions can be realized.

Those skilled in the art can understand that the accompanying drawings are schematic diagrams of a preferred embodiment, and the serial numbers of embodiments of the present invention are merely descriptive and do not indicate the priority of the embodiments.

The forgoing description merely shows preferred embodiments of the present invention and is not intended to limit the present invention. Any modification, equivalent replacement and improvement made within the spirit and principle of the present invention shall fall into the protection scope of the present invention.

What is claimed is:

1. A synchronization method for multi-station data of dynamic coordinate measurement by a workshop measuring and positioning network, comprising the following steps of:
    determining a measuring and positioning space according to the in-situ measurement dimension, selecting locations for placing a plurality of transmitters, calibrating external parameters of the transmitters by a reference ruler, and establishing a measurement field;
    In a communication data packet of a signal processor, attaching local clock information into the angle information of each transmitting station; and
    Setting fixed time nodes on a time axis, and synchronizing data of different transmitters to corresponding time nodes so as to realize data synchronization.

2. The synchronization method for multi-station data of dynamic coordinate measurement by a workshop measuring and positioning network according to claim 1, wherein the step of "In a communication data packet of a signal processor, attaching local clock information into the angle information of each transmitter" specifically comprises the steps of:
    1) Receiving, by a receiver, synchronous light pulse signals and scanning light pulse signals transmitted by the transmitters, converting the synchronous light pulse signals and scanning light pulse signals into electrical pulses, and transmitting the electrical pulses to the signal processor;
    2) Matching, by the signal process and by using internal crystal oscillator as a timing standard, the timing on the electrical pulses of different transmitters according to the period of rotation of the transmitters; and
    3) Packing, by the signal processor, the angle information of different transmitters and corresponding timestamps received by a same receiver to form data frames, and uploading the data frames to a computing workstation.

3. The synchronization method for multi-station data of dynamic coordinate measurement by a workshop measuring and positioning network according to claim 1, wherein the step of "Setting fixed time nodes on a time axis, and synchronizing data of different transmitters to corresponding time nodes so as to realize data synchronization" specifically comprises the steps of:
    1) Selecting the timestamp $t_{on}$ of the latest moment from the receiver, and extracting the timestamp $t_{on-1}$ of the previous moment adjacent to the latest moment, where the time mode corresponding to the timestamp of the latest moment is $t_{pn}$;
    2) Synchronizing data of the transmitting stations at a moment having a timestamp $t_{on}$ onto the time node $t_{pn}$; and
    3) Synchronizing data of all the transmitters onto corresponding time nodes, and obtaining coordinate values at this moment by an angle intersection principle, so as to realize data synchronization of multiple transmitters.

* * * * *